(12) United States Patent
Choi et al.

(10) Patent No.: US 9,241,290 B2
(45) Date of Patent: Jan. 19, 2016

(54) APPARATUS AND METHOD FOR CONTROLLING HANDOVER TO PREVENT FEMTOCELL INTERFERENCE

(71) Applicant: KT CORPORATION, Gyeonggi-do (KR)

(72) Inventors: Byoung-Jin Choi, Gyeonggi-do (KR); Tae-Won Ban, Gyeonggi-do (KR); Chang-Yong Ahn, Gyeonggi-do (KR); Sung-Sang You, Seoul (KR); Kyeong-Soo Lee, Seoul (KR); Hee-Jun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/329,114

(22) Filed: Jul. 11, 2014

(65) Prior Publication Data

US 2014/0323134 A1    Oct. 30, 2014

Related U.S. Application Data

(63) Continuation of application No. 13/399,216, filed on Feb. 17, 2012, now abandoned.

(30) Foreign Application Priority Data

Feb. 17, 2011    (KR) .................. 10-2011-0014199

(51) Int. Cl.
*H04W 36/00* (2009.01)
*H04W 84/04* (2009.01)
*H04W 88/08* (2009.01)

(52) U.S. Cl.
CPC ...... *H04W 36/0072* (2013.01); *H04W 36/0055* (2013.01); *H04W 88/08* (2013.01); *H04W 84/045* (2013.01)

(58) Field of Classification Search
CPC ... H04W 36/00; H04W 52/24; H04W 84/045; H04W 48/00; H04W 52/244; H04J 2211/001
USPC .......... 455/63.1, 114.2, 278.1, 296, 436–444, 455/447–449; 370/331
See application file for complete search history.

(56) References Cited

U.S. PATENT DOCUMENTS

| 7,145,890 | B1 | 12/2006 | Seo et al. |
| 2006/0013325 | A1 | 1/2006 | Agrawal et al. |

(Continued)

FOREIGN PATENT DOCUMENTS

| KR | 10-2001-0017137 A | 3/2001 |
| KR | 10-2009-0099058 A | 9/2009 |

(Continued)

*Primary Examiner* — Michael Mapa
(74) *Attorney, Agent, or Firm* — IP Legal Services, LLC

(57) ABSTRACT

Provided are apparatus and method for controlling handover to prevent femtocell interference. The apparatus may include an event receiving module, a handover determining module, and an inter-frequency processing module. The event receiving module may be configured to receive a control message from user equipment. The handover determining module may be configured to analyze the received control message and determine whether the control message includes a request of inter-cell handover from a first cell base station of the first cell to a second cell base station of one of the second cells. The inter-frequency processing module may be configured to perform inter-frequency handover using an unshared frequency when the handover determining module determines that the control message includes the request of inter-cell handover.

12 Claims, 6 Drawing Sheets

(56) References Cited

U.S. PATENT DOCUMENTS

| | | |
|---|---|---|
| 2008/0146226 A1 | 6/2008 | Claussen et al. |
| 2009/0137251 A1* | 5/2009 | Ji et al. .................... 455/437 |
| 2009/0239533 A1* | 9/2009 | Somasundaram et al. .... 455/434 |
| 2009/0290652 A1 | 11/2009 | Rezaiifar et al. |
| 2010/0015921 A1 | 1/2010 | Yavuz et al. |
| 2010/0173631 A1* | 7/2010 | Kim et al. .................... 455/436 |
| 2011/0013600 A1* | 1/2011 | Kim ................ H04L 5/0085 370/332 |
| 2011/0014920 A1* | 1/2011 | Nylander ............ H04W 36/02 455/442 |
| 2011/0149771 A1 | 6/2011 | Abeta et al. |
| 2011/0300870 A1 | 12/2011 | Chun et al. |

FOREIGN PATENT DOCUMENTS

| | | |
|---|---|---|
| KR | 10-2010-0009932 A | 1/2010 |
| KR | 10-2010-0046492 A | 5/2010 |
| KR | 10-2010-0096015 A | 9/2010 |
| KR | 10-2010-0129315 A | 12/2010 |
| KR | 10-2010-0132845 A | 12/2010 |
| KR | 10-2011-0010121 A | 1/2011 |

\* cited by examiner

APPARATUS AND METHOD FOR CONTROLLING HANDOVER TO PREVENT FEMTOCELL INTERFERENCE

CROSS REFERENCE TO PRIOR APPLICATIONS

The present application is continuation application of U.S. patent application Ser. No. 13/399,216 (filed on Feb. 17, 2012), which claims priority under 35 U.S.C. §119 to Korean Patent Application No. 10-2011-0014199 (filed on Feb. 17, 2011), which is hereby incorporated by reference in its entirety.

FIELD OF THE INVENTION

The present invention relates to communication networks and, in particular, to controlling handover.

BACKGROUND OF THE INVENTION

A femtocell is a small cellular base station that provides a mobile communication service in a comparatively narrow area. The femtocell has various advantages of expanding indoor service coverage, improving service quality, and effectively providing various wired and wireless integrated services. In addition, the femtocell has low installation and maintenance fees. Further, the femtocell can be installed in any location where an Internet channel is available.

One of the main purposes of introducing a femtocell is to distribute network load in a macrocell and to increase service capacity of the macrocell. For example, a plurality of femtocells may be installed within a service area of a macrocell in order to overcome a shortage in the service capacity of a macrocell. Since multiple femtocells are installed within a single macrocell, the femtocells, however, may cause a frequency interference problem, known as femtocell interference.

Furthermore, femtocells may be allocated with the same identification codes. Each base station is allocated an identification code in order for the base station to be distinguished from other base stations. For efficient system management, only a limited number of identification codes is available. Most of the available identification codes are allocated to macrocell base stations first, and only the few remaining identification codes may be allocated to femtocell base stations. Due to a shortage of identification codes, the same identification codes may be reused for multiple femtocell base stations installed in a service area of a macrocell. Such duplication of identification codes may cause a failure of the inter-cell handover from a macrocell base station to a femtocell base station. For example, when a handover procedure is performed from a macrocell to a femtocell, a target femtocell base station may not be distinguishable from other femtocell base stations. Particularly, when a target femtocell base station has the same identification code of other base station, the handover procedure may fail.

Such a failure in handover may also cause serious frequency interference problems. Such frequency interference problems may degrade the service quality of the overall communication network and deteriorate the load distribution effect of femtocell.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, handover may be controlled in consideration of femtocell interference.

In accordance with another aspect of the present invention, inter-frequency handover may be performed when inter-cell handover from a macrocell to a femtocell is requested.

In accordance with an exemplary embodiment of the present invention, a method may be provided for controlling handover in a communication network where a first cell is overlapped with a plurality of second cells. The method may include receiving a request of inter-cell handover from a first cell base station of the first cell to a second cell base station of one of the second cells, and performing an inter-frequency handover in response to the request of the inter-cell handover.

User equipment may make the request of inter-cell handover when the user equipment in a traffic state enters into the one of the second cells.

The receiving a request of inter-cell handover may include determining whether the second cells are femtocells. The inter-frequency handover is performed if the second cells are femtocells.

The method may further include performing the inter-cell handover from the first cell base station to the second cell base station when the second cells are macrocells.

The receiving a request of inter-cell handover may include determining whether a first frequency used by the first cell base station is equivalent to a second frequency assigned to the second cell base station, and performing the inter-frequency handover.

The method may further include performing the inter-cell handover from the first cell base station to the second cell base station when the first frequency is different from the second frequency.

The performing the inter-frequency handover in response to the request of the inter-cell handover may include selecting an unshared frequency, and performing the inter-frequency handover to the selected unshared frequency. The unshared frequency may be a frequency unassigned to the one of the second cells.

In the selecting an unshared frequency, a frequency having load less than a given load level and quality higher than a given quality level may be selected from frequencies assigned to the first cell and unassigned to the second cells.

After performing the inter-frequency handover, user equipment may be coupled to the first cell base station using the selected unshared frequency.

In accordance with another embodiment of the present invention, a method may be provided for controlling handover in a communication network where a macrocell is overlapped with a plurality of femtocells. The method may include transmitting a measurement control message to user equipment when the user equipment in a traffic state enters from the macrocell to one of the femtocells, receiving a measurement report message from the user equipment, determining whether the measurement report message includes a request of inter-cell handover from a macrocell base station of the macrocell to a femtocell base station of the one of the femtocells, selecting an unshared frequency from unshared frequencies assigned to a macrocell base station of the macrocell and unassigned to a femtocell base station of the one of the femtocells when the measurement report message includes the request of inter-cell handover from the macrocell to the one of the femtocells, and performing inter-frequency handover based on the selected unshared frequency in response to the request of the inter-cell handover.

The method may further include performing the inter-cell handover from the macrocell to another macrocell when the measurement report message includes a request of inter-cell handover from the macrocell to another macrocell.

The method may further include determining whether a first frequency used by the macrocell base station is equivalent to a second frequency assigned to the femtocell base station, performing an inter-cell handover from the macrocell base station to the femtocell base station when the first frequency is different from the second frequency, and performing the inter-frequency handover using the unshared frequency when the first frequency is equivalent to the second frequency.

In accordance with another embodiment of the present invention, an apparatus may be provided for controlling handover in a communication network where a first cell is overlapped with a plurality of second cells. The apparatus may include an event receiving module, a handover determining module, and an inter-frequency processing module. The event receiving module may be configured to receive a control message from user equipment. The handover determining module may be configured to analyze the received control message and determine whether the control message includes a request of inter-cell handover from a first cell base station of the first cell to a second cell base station of one of the second cells. The inter-frequency processing module may be configured to perform inter-frequency handover using an unshared frequency when the handover determining module determines that the control message includes the request of inter-cell handover.

The event receiving module may receive the control message when the user equipment in a traffic state enters the one of the second cells.

The handover determining module may determine whether or not the second cell base station is a femtocell base station. In this case, the inter-frequency processing module may perform the inter-frequency handover when the second cell base station is the femtocell base station.

The apparatus may further include an inter-cell handover processing module. The inter-cell handover processing module may be configured to perform an inter-cell handover when the handover determining module determines that the second base station is a macrocell base station.

The handover determining module may determine whether or not a first frequency used by the first cell base station is equivalent to a second frequency assigned to the second cell base station. The inter-frequency processing module may perform the inter-frequency handover when the first frequency is equivalent to the second frequency.

The apparatus may further include an inter-cell handover processing module. The inter-cell handover processing module may be configured to perform an inter-cell handover when the first frequency is different from the second frequency.

The handover determining module may include a frequency selector. The frequency selector may be configured to select the unshared frequency from frequencies assigned to the first cell base station and un assigned to the second cell base station. A frequency having load less than a given load level and quality higher than a given quality level may be selected from the frequencies, as the unshared frequency.

After performing the inter-frequency handover, the user equipment may be coupled to the first cell base station using the unshared frequency.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
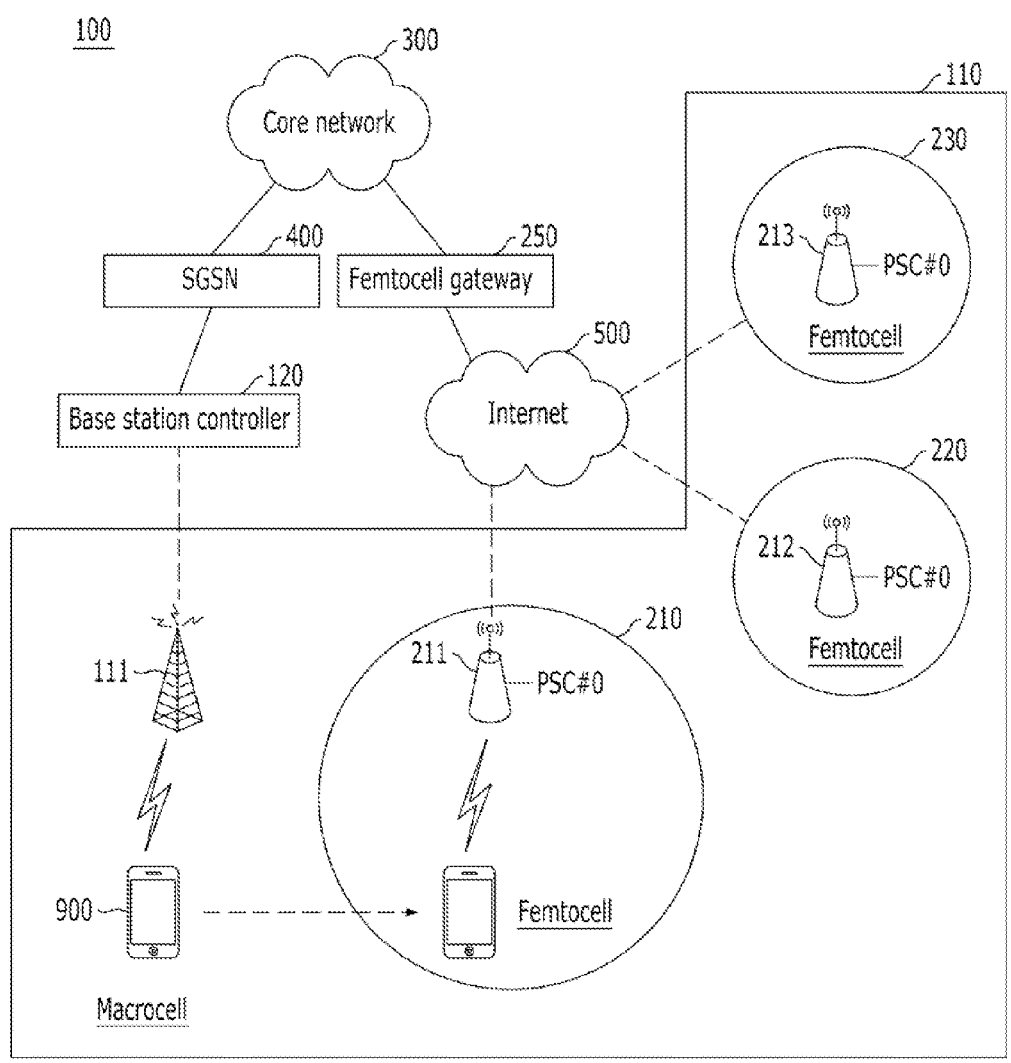
FIG. 1 illustrates a mobile communication system in accordance with an exemplary embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 illustrates a mobile communication system in accordance with an exemplary embodiment of the present invention.

Referring to FIG. 1, mobile communication system 100 may include a macrocell base station 111, femtocell base stations 211, 212, and 213, core network 300, base station controller 120, and femtocell gateway 250. As illustrated in FIG. 1, macrocell 110 may be overlapped with multiple femtocells 210, 220, and 230.

Macrocell 110 may be a typical radio access cell of a wireless communication system. Macrocell 110 may include microcell base station 110. Macrocell 110 may provide a mobile communication service to user equipment 900 through microcell base station 110.

Femtocells 210, 220, and 230 may be radio access cells installed for maintaining a proper quality level of a mobile communication service in a shadow area of a macrocell and for expanding service quantity of a macrocell. As shown in FIG. 1, femtocells 210, 220, and 230 may be installed inside macrocell 110. Femtocells 210, 220, and 230 may include femtocell base stations 211, 212, and 213, respectively. Femtocell base stations 211, 212, and 213 may be coupled to Internet protocol (IP) network 500 and femtocell gateway 250. When user equipment 900 enters one of femtocells 210, 220, and 230, user equipment 900 may perform an inter-cell handover procedure from macrocell base station 111 to corresponding one of femtocell base stations 211, 212, and 213. Femtocells 210, 220, and 230 may be coupled to core network 300 through IP network 500 and femtocell gateway 250.

Core network 300 may be a mobile communication network for providing a data service and a voice service. Core network 300 may be coupled to macrocell 110 through serving GPRS support node (SGSN) 400. Core network 300 may be coupled to femtocells 210, 220, and 230 through femtocell gateway 250 and IP network 500. Particularly, core network 300 may provide a data service and a voice service to user equipment 900 in macrocell 110 or femtocells 210, 220, and 230.

Macrocell base station 111 may be an access point for macrocell 110. Macrocell base station 111 may be coupled to base station controller 120 and may manage radio resources in response to the control of base station controller 120. For example, macrocell base station 111 may be a base station transceiver subsystem (BTS) or a Node B.

Base station controller 120 may allocate and release a radio channel, control transmission of user equipment 900 and macrocell base station 111, determine inter-cell handover and/or inter-frequency handover, manage radio resources, and manage and maintain macrocell base station 111.

Femtocell gateway 250 may couple IP network 500 to core network 300. Accordingly, femtocell gateway 250 may enable user equipment 900 to access femtocell base stations 211, 212, and 213 to communicate with other user equipment. Femtocell gateway 250 may receive data such as mobile contents through core network 300 to transmit the received data to user equipment 900 accessing one of femtocell base stations 211, 212, and 213. Femtocell gateway 250 may perform protocol conversion between core network 300 and IP network 500.

Femtocell base stations 211, 212, and 213 may be installed at a shadow area or an area in macrocell 110, where a radio signal of macrocell 110 is weak. For example, femtocell base stations 211, 212, and 213 may be installed within a service area of macrocell 110 to increase service capacity of macrocell 110 and to distribute network load in macrocell 110. Femtocell base stations 211, 212, and 213 may be allocated with identification codes. As described above, such identification codes are reused with other femtocell base stations or macrocell base stations because the number of available identification codes is limited for efficiently managing radio resources in an associated communication network. For example, femtocell base stations 211, 212, and 213 may be allocated the same identification code PSC#0.

When user equipment 900 in macrocell service area 110 transitions to femtocell service area 210, an inter-cell handover procedure from macrocell base station 111 to femtocell base station 211 may be initiated. Femtocell base station 211, however, has an identification code PSC#0 which is the same as the identification code used by the other femtocell base stations 212 and 213. Since a network cannot accurately identify femtocell base station 211 where user equipment 900 transitions to femtocell service area 210, a handover procedure cannot be normally performed. Accordingly, user equipment 900 may fail in handover from macrocell 110 to femtocell 210 due to duplication of femtocell identification codes. Such a handover failure may cause a frequency interference problem between a macrocell and a femtocell using a same frequency, which is known as femtocell interference. The frequency interference problem may degrade service quality and overall system performance. Furthermore, the frequency interference problem may decrease service capacities of both the macrocell and femtocells.

In accordance with an embodiment of the present invention, a handover procedure may be controlled in consideration of femtocell interference. For example, when user equipment 900 attempts to perform handover from macrocell 110 to one of femtocells 210, 220, and 230, inter-frequency handover may be performed instead of performing inter-cell handover. This manner of controlling a handover procedure may prevent the frequency interference problem occurring in an associated communication network.

As described above, since radio resources including frequencies are limited in a communication network, some of the frequencies used are carefully assigned for communication in macrocells and femtocells. Hereinafter, such a frequency assignment will be briefly described with reference to FIG. 2.

Figure 2:
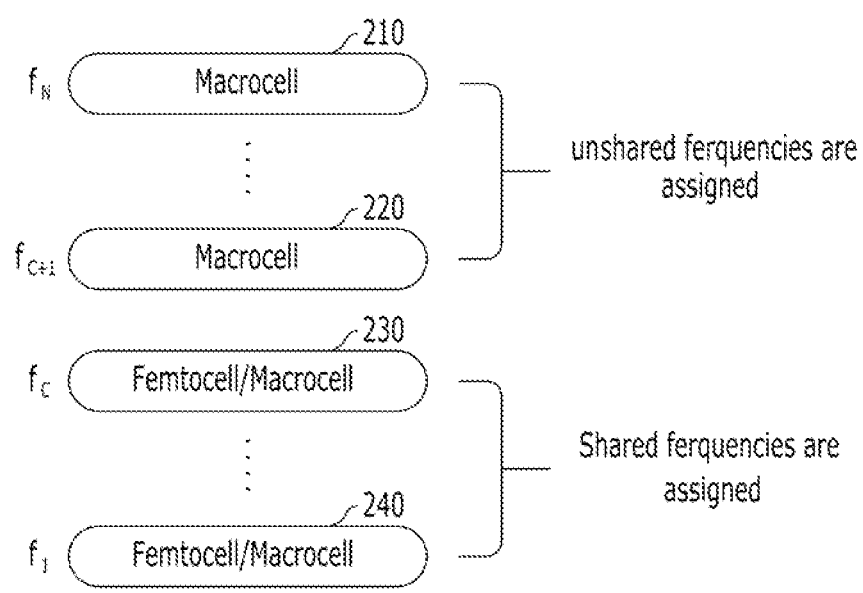
FIG. 2 illustrates frequency assignment in macrocell and femtocells.

FIG. 2 illustrates frequency assignment in macrocell and femtocells.

As illustrated FIG. 2, frequencies f1 to fN may be available for assignment to macrocell and femtocells. Among frequencies f1 to fN, frequencies f1 to fC may be commonly assigned to femtocells and macrocells. That is, frequencies f1 to fC are termed herein as "shared frequencies." Frequencies f(C+1) to fN may be dedicated for assignment to macrocells, termed herein as "unshared frequencies." That is, frequencies f(C+1) to fN may be unshared frequencies within a macrocell. As described above, radio resources such as frequencies for transmission are limited in a communication network. In order to efficiently utilize such limited frequencies, a comparative larger number of frequencies are assigned to macrocells, as compared to the number of frequencies assigned to femtocells, and femtocells may share some of frequencies assigned to the macrocells.

Accordingly, when user equipment 900 communicates through a shared frequency enters a femtocell service area, frequency interference problems may be arisen when the macrocell and the femtocell use the shared frequencies f1 to fC. In order to prevent such a frequency interference problem, an inter-frequency handover is performed when, and subsequently in place of, an inter-cell handover request between a macrocell and a femtocell in accordance with an exemplary embodiment of the present invention. Hereinafter, inter-frequency handover performed to prevent femtocell interference in accordance with an exemplary embodiment of the present invention will be described with reference to FIG. 3.

Figure 3:
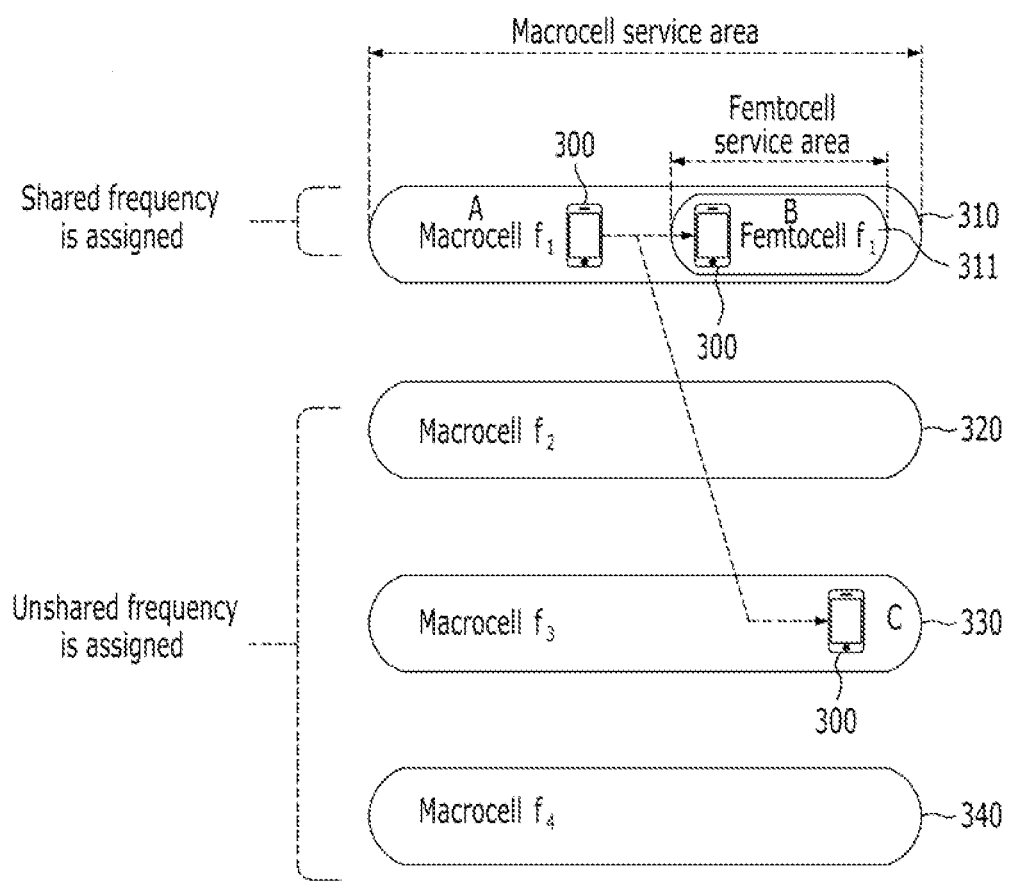
FIG. 3 illustrates inter-frequency handover performed to prevent femtocell interference in accordance with an exemplary embodiment of the present invention.

FIG. 3 illustrates inter-frequency handover performed to prevent femtocell interference in accordance with an exemplary embodiment of the present invention.

Referring to FIG. 3, a shared frequency f1 may be assigned to both of macrocell 310 and femtocell 311. Unshared frequencies f2 to f4 may be dedicatedly assigned to macrocells 320 to 340. User equipment 300 may communicate with other user equipment or receive a data service from an associated server using frequency f1 when user equipment 300 stays at an area A in a service area of macrocell 310 outside of the area of femtocell 311. When user equipment 300 enters to a service area B of femtocell 311, user equipment 300 may attempt to perform handover from macrocell 310 to femtocell 311. Since macrocell 310 and femtocell 311 use the shared frequency f1, such an inter-cell handover may cause a frequency interference problem. In order to prevent such a frequency interference problem, an inter-frequency handover is performed instead of the inter-cell handover in accordance with an exemplary embodiment of the present invention. For example, when user equipment 300 requests inter-cell handover to a femtocell base station of femtocell 311, the femtocell base station may transmit a handover request to a base station controller of macrocell 310. The base station controller may select one frequency from unshared frequencies f2 to f4 based on a load and a quality thereof. For example, the base station controller may select an unshared frequency having less load and excellent quality from unshared frequencies f2 to f4. FIG. 3 illustrates unshared frequency f3 is selected, but the present invention is not limited thereto. After selection, the base station controller may perform inter-frequency handover from shared frequency f1 to unshared frequency f3, in accordance with an exemplary embodiment of the present invention. Macrocells 310, 320, 330, and 340 are illustrated as being assigned with only one frequency in FIG. 3. However, each macrocell may be assigned multiple frequencies.

For example, a macrocell base station of macrocell 310 may be assigned multiple frequencies f1 and f3. In this case, a service base station and a target base station may be same in inter-frequency handover.

As described above, inter-cell handover from macrocell 310 to femtocell 311 is not performed although user equipment 300 enters to the service area B of femtocell 311, in accordance with an exemplary embodiment of the present invention. Instead of performing the inter-cell handover, inter-frequency handover from shared frequency f1 to unshared frequency f3 may be performed. That is, a frequency assigned to macrocell may become different from a frequency assigned to femtocell as a result of the inter-frequency handover. Accordingly, a frequency interference problem may not arise although inter-cell handover from macrocell to femtocell is failed. Hereinafter, a method for controlling handover in consideration of femtocell interference in accordance with an exemplary embodiment of the present invention will be described in detail. For convenience and ease of understanding, it is assumed that user equipment is located at a service area of a macrocell where a plurality of femtocells are overlapped therewith, as shown in FIG. 1. Accordingly, the method for controlling handover to prevent femtocell interference will be described with reference to FIG. 1 and FIG. 4.

Figure 4:
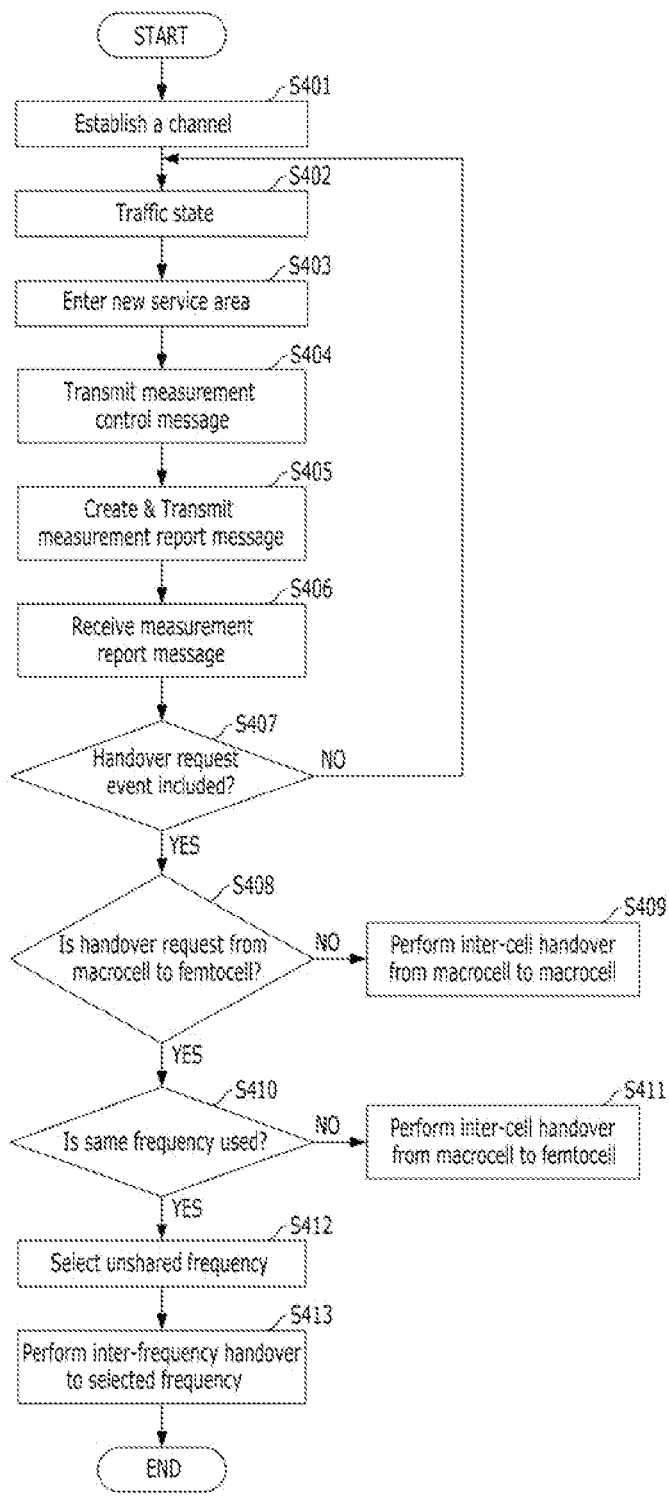
FIG. 4 illustrates a method for controlling handover to prevent femtocell interference in accordance with an embodiment of the present invention.

FIG. 4 illustrates a method for controlling handover to prevent femtocell interference in accordance with an embodiment of the present invention.

Referring to FIG. 4, a channel may be established between user equipment 900 and macrocell base station 111 at step S401. User equipment 900 may be located in a service area of macrocell 110. After establishing the channel, user equipment 900 may be in a traffic state at step S402. For example, in the traffic state, user equipment 900 may communicate with other user equipment or receive and transmit data through the channel established to femtocell base station 111.

User equipment 900 in the traffic state may enter to femtocell 210 at step S403. Upon entering of femtocell 210, macrocell base station 111 may transmit a measurement control message to user equipment 900 at step S404.

Upon the receipt of the measurement control message, user equipment 900 may measure a peripheral wireless environment, create a measurement report message, and transmit the measurement report message to the macrocell base station 111 at step S405. Macrocell base station 111 may receive the measurement report message at step S406. Macrocell base station 111 may analyze the received measurement report message whether a handover request event is included in the measurement report message at step S407. When the measurement report message does not include the handover request event (No—step S407), the method returns to step S402.

When the measurement report message includes the handover request event (Yes—step S407), determination may be made as to whether the handover request event is an inter-cell handover request from macrocell 110 to femtocell 210 at step S408. When the handover request event is the inter-cell handover request from macrocell 110 to another macrocell (No—step S408), an inter-cell handover from macrocell 110 to other macrocell may be performed at step S409.

When the handover request event is the inter-cell handover request from macrocell 110 to femtocell 210 (Yes—step S408), determination may be made as to whether or not macrocell 110 and femtocell 210 use a same frequency at step S410. When macrocell 110 and femtocell 210 use different frequencies (No—step S410), an inter-cell handover from macrocell 110 to femtocell 210 may be performed at step S411.

When macrocell 110 and femtocell 210 use the same frequency (Yes—step S410), macrocell base station 111 may select an unshared frequency at step S412. That is, macrocell base station 111 may initiate an inter-frequency handover instead of inter-cell handover in accordance with an exemplary embodiment of the present invention. Macrocell base station 111 may select an unshared frequency from a group of available unshared frequencies. Macrocell base station 111 may select one having comparative less load and higher quality the group of available unshared frequencies.

After selection, macrocell base station 111 may perform inter-frequency handover with the selected unshared frequency at step S413. As a result of the inter-frequency handover, macrocell base station 111 may be changed to a macrocell base station assigned with the selected unshared frequency, and a frequency of user equipment 900 may be changed to the selected unshared frequency.

As described above, when macrocell 110 and femtocells use the same frequency, the inter-frequency handover from a shared frequency to an unshared frequency may be performed although an inter-cell handover from macrocell 110 to femtocell 210 is requested, in accordance with an exemplary embodiment of the present invention. After the inter-frequency handover, user equipment 900 may use a different frequency from that of femtocell 210. Accordingly, frequency interference problems such as femtocell interference may be prevented. Such a method may be further more effective when femtocell base stations cannot be identified in an associated communication network due to duplication of identification codes and when the signal strength of a macrocell base station is stronger than that of a femtocell base station.

Figure 5:
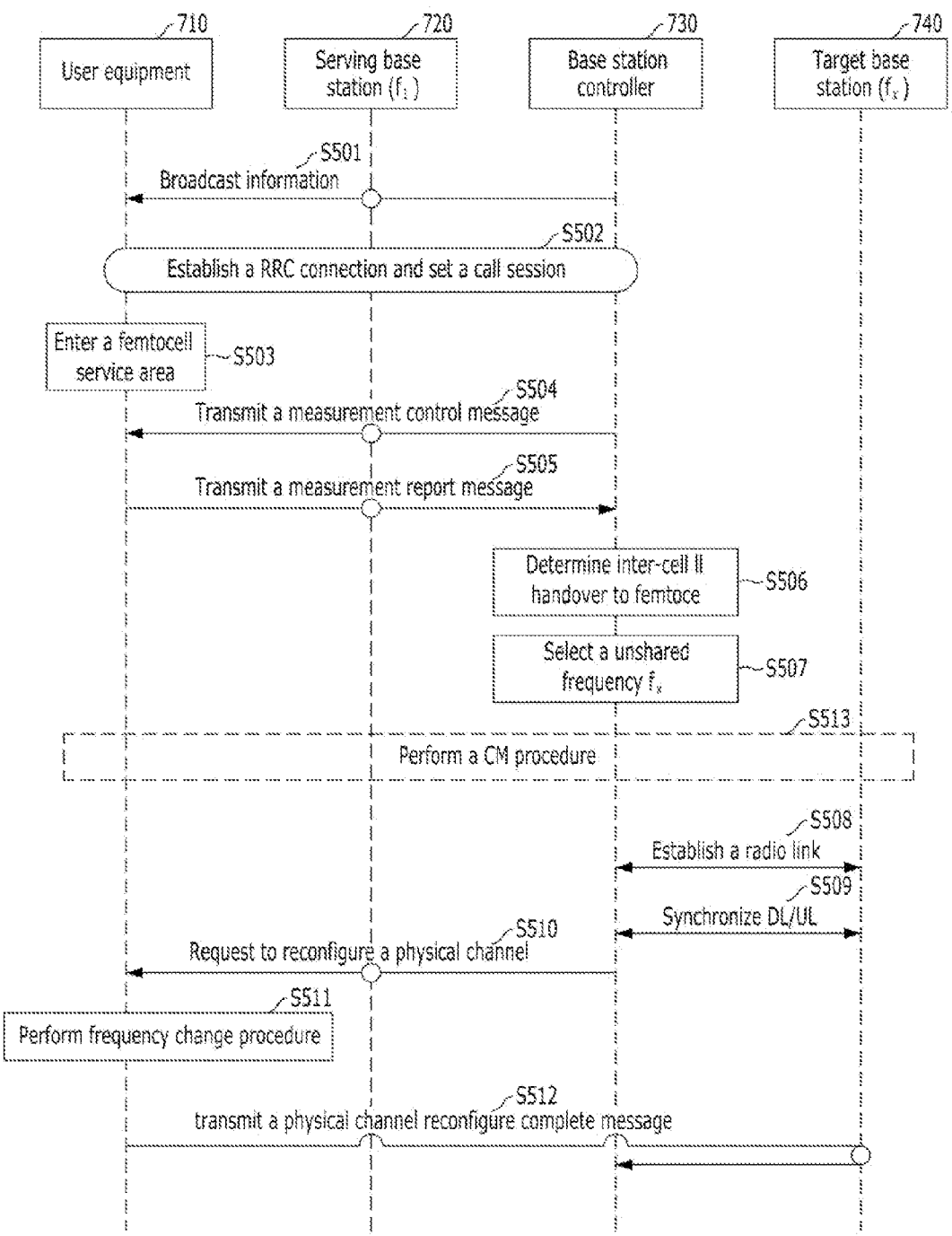
FIG. 5 illustrates a method for controlling handover to prevent femtocell interference in accordance with another exemplary embodiment of the present invention.

FIG. 5 illustrates a method for controlling handover to prevent femtocell interference in accordance with another exemplary embodiment of the present invention.

In FIG. 5, the method for controlling handover to prevent femtocell interference will be described as controlling handover in a wideband code division multiple access (WCDMA) system. The present invention, however, is not limited thereto. The method for controlling handover to prevent femtocell interference may be applied to a typical mobile communication system including a code division multiple access (CDMA) system, a global system for mobile communications (GSM) system, and an orthogonal frequency-division multiplexing (OFDM) system.

Referring to FIG. 5, base station controller 730 may perform information broadcasting to user equipment 710 in an idle state through serving base station 720 at step S501. The information may include a neighbor list of macrocell base stations and a neighbor list of femtocell base stations. The neighbor lists may be included in a system information block (SIB) in the broadcasted information.

Based on the broadcasted information including the neighbor lists, a radio resource control (RRC) connection may be established between user equipment 710 and base station controller 730 and a call session may be set through the RRC connection at step S502. For example, the idle state of user equipment 710 may transit to a traffic state. User equipment 710 may form a channel through a shared frequency f1 to macrocell base station, for example, serving base station 720, and communicate with other entity on an associated communication network. The shared frequency f1 may be a frequency commonly used with femtocells included in the neighbor list.

User equipment 710 may enter a femtocell service area of femtocell 740 while communication with other entity at step S503. For example, femtocell 740 may be a target base station using the shared frequency f1.

When user equipment 710 enters the femtocell service area, base station controller 730 may detect the entering of the femtocell service area and transmit a measurement control message to user equipment 710 through serving base station 720 at step S504. The measurement control message may invoke user equipment 710 to measure peripheral radio environment. The measurement control message may include a neighbor list. For example, identification codes of femtocell base stations may be included in the neighbor list.

User equipment 710 may receive the measurement control message from base station controller 730 through serving base station 720. Serving base station 720 may be a macrocell base station using a shared frequency f1. Upon the receipt of the measurement control message, user equipment 710 may measure radio signal strengths of neighboring base stations, create a measurement report message based on the measurement result, and transmit the measurement repot message to base station controller 730 through serving base station 720 at step S505. The measurement report message may include information on a handover request event. For example, user equipment 710 may measure the radio signal strengths of base stations included in the neighbor list and compare the measured radio signal strengths to each other. Alternatively, user equipment 710 may compare the measured radio signal strength with a given threshold. Based on the comparison result, user equipment 710 may select one base station satisfying a given condition and generate a handover request event based on the selected base station. The present invention, however, is not limited thereto. Handover request events may be invoked with various methods.

Base station controller 730 may receive the measurement report message from user equipment 710 through serving base station 720 and determine whether the measurement report message includes a handover request event at step S506. Base station controller 730 may also determine whether the handover request event is a request for handover from a macrocell to a femtocell. When the handover request event is a request for handover from a macrocell to another macrocell, an inter-cell handover from a macrocell to another macrocell may be performed.

However, when the handover request event is a request for handover from a macrocell to a femtocell, an inter-frequency handover may be initiated instead of inter-cell handover from a macrocell to a femtocell, in accordance with another exemplary embodiment of the present invention. As the inter-frequency handover, base station controller 730 may select an unshared frequency fx at step S507. Base station controller 730 may select an unshared frequency having comparative less load and better quality from available unshared frequencies.

Before selection of an unshared frequency fx, a frequency of serving base station may be compared with a frequency of a target base station. When the frequency of the serving base station is different from that of the base station, an inter-cell handover from a macrocell to a femtocell may be performed. The present invention, however, is not limited thereto.

After selecting the unshared frequency fx, base station controller 730 may perform the inter-frequency handover to the selected frequency fx. At first, a radio link may be established to target base station 740 using the selected frequency fx at step S508. Since femtocells are not allocated unshared frequencies, a femtocell base station cannot be selected as a target base station. In general, a serving base station may be selected again as a target base station because a base station may be assigned with multiple unshared frequencies. Accordingly, serving base station 720 may be selected as target base station 740 when serving base station 720 is also assigned with unshared frequency fx. The present invention, however, is not limited thereto. Another femtocell base station assigned with the selected unshared frequency fx may be selected as target base station 740.

After establishing the radio link, an uplink and a downlink may be synchronized with the selected frequency fx of target base station 740 at step S509. Base station controller 730 may request user equipment 710 to reconfigure a physical channel through serving base station 720 at step S510. In response to the request, user equipment 710 may reconfigure a physical channel by performing a frequency change procedure at step S511. For example, user equipment 710 may release a physical channel established using the shared frequency f1 and establish a physical channel using the selected frequency fx. User equipment 710 may transmit a physical channel reconfigure complete message to base station controller 730 through target base station 740 at step S512.

As establishing the physical channel between user equipment 710 to target base station 740 using the selected unshared frequency fx, the inter-frequency handover may be completed. As described above, when user equipment 710 requests an inter-cell handover to a femtocell after entering a service area of the femtocell, an unshared frequency may be selected and an inter-frequency handover to the selected unshared frequency may be performed instead of performing the inter-cell handover, in accordance with an exemplary embodiment of the present invention. Accordingly, a femtocell interference problem and/or a handover failure problem may be prevented in accordance with an exemplary embodiment of the present invention.

In accordance with an exemplary embodiment of the present invention, the method for controlling handover to prevent femtocell interference may further include a compressed mode (CM) procedure at step S513. Such a CM procedure may be performed after selecting an unshared frequency fx. For example, a cell quality of a base station assigned with the selected unshared frequency fx may be analyzed with a compressed mode. When the cell quality is higher than a given quality level, an associated handover may be permitted.

Figure 6:
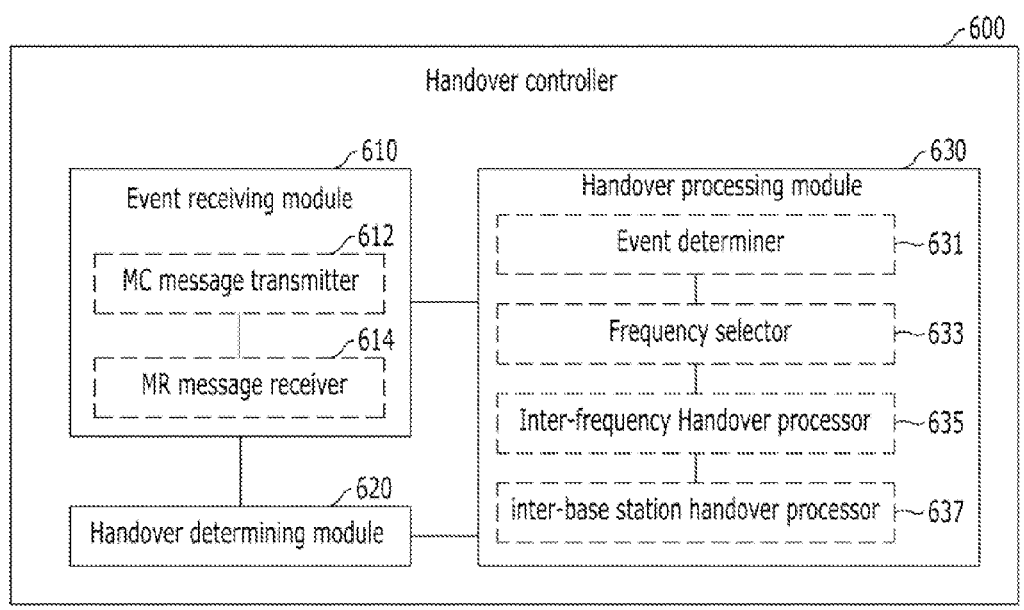
FIG. 6 illustrates an apparatus for controlling handover to prevent femtocell interference in accordance with an embodiment of the present invention.

FIG. 6 illustrates an apparatus for controlling handover to prevent femtocell interference in accordance with an embodiment of the present invention.

Referring to FIG. 6, apparatus 600 for controlling handover to prevent femtocell interference may include event receiving module 610, handover determining module 620, and handover processing module 630. Apparatus 600 may be a base station controller of an associated mobile communication system, but the present invention is not limited thereto. For example, apparatus 600 may be an independent server coupled to the base station controller or be integrally implemented with the base station controller.

Event receiving module 610 may receive an event message from user equipment through a serving base station. Event receiving module 610 may include measurement control (MC) message transmitter 612 and measurement report (MP) message receiver 614. MC message transmitter 612 may transmit a measurement control message to user equipment through a serving base station. Apparatus 600 may control user equipment to measure peripheral radio environment through the measurement control message. MR message receiver 614 may receive a measurement report message from the user equipment through the serving base station. In response to the measurement control message, the user equipment may measure peripheral radio environment, create the measurement report message based on the measurement result, and transmit the measurement repot message to MR message receiver 614 through the serving base station. The measurement report message may include information on the result of measuring peripheral radio environment and an event generated based on the measurement result. For example, the event may be a handover request event.

Handover determining module 620 may determine whether inter-cell handover is requested based on the measurement report message. For example, handover determining module 620 may analyze the received measurement report message, determine whether the received measurement report message includes a handover request event, and determine whether the handover request event is a request of inter-cell handover from a macrocell to a femtocell. Handover determining module 620 may perform the determination operation for user equipment in a traffic state.

Handover processing module 630 may process a handover procedure according to the determination result of handover determining module 620. Handover processing module 630 may include event determiner 631, frequency selector 633, inter-frequency handover processor 635, and inter-cell handover processor 637.

Event determiner 631 may determine whether the handover request event is an inter-cell handover from a macrocell to a femtocell. When event determiner 631 determines that the handover request event is an inter-cell handover from a macrocell to a femtocell, event determiner 631 may control frequency selector 633 and inter-frequency handover processor 635 to perform an inter-frequency handover. When event determiner 631 determines that the handover request event is an inter-cell handover from a macrocell to a macrocell, event determiner 631 may control inter-cell handover processor 637 to perform the inter-cell handover from a macrocell to another macrocell. Furthermore, event determiner 631 may determine whether a same shared frequency is used by a serving macrocell base station and a target femtocell base station. When event determiner 631 determines that different shared frequencies are used by both of the serving macrocell base station and the target femtocell base station, event determiner 631 may control inter-cell handover processor 637 to perform an inter-cell handover from a macrocell to a femtocell.

Frequency selector 633 may select an unshared frequency in response to the control of event determiner 631. The unshared frequency may be a frequency not used by a femtocell base station and only used by a macrocell base station. When multiple unshared frequencies are available, frequency selector 633 may select one having comparative less load and better quality from multiple unshared frequencies. Furthermore, frequency selector 633 may select an unshared frequency having a load less than a given load level and a quality higher than a given quality level from multiple unshared frequency.

Inter-frequency handover processor 635 may perform inter-frequency handover based on the selected unshared frequency in response to the control of event determiner 631. For example, inter-frequency handover processor 635 may receive the selected unshared frequency from frequency selector 633. Inter-frequency handover processor 635 may perform handover to a target macrocell base station assigned with the selected unshared frequency. The target macrocell base station may be a serving macrocell base station when the serving macrocell base station is assigned with multiple frequencies including the selected unshared frequency.

Inter-cell handover processor 637 may perform inter-cell handover from a macrocell to a macrocell in response to the control of event determiner 631. For example, when event determiner 631 determines that the handover request event is inter-cell handover from a macrocell to another macrocell, inter-cell handover processor 637 may perform inter-cell handover. For another example, when event determiner 631 determines that a current frequency used by a serving macrocell base station is different from a frequency used by a target femtocell base station, inter-cell handover processor 637 may perform inter-cell handover from the serving macrocell base station to the target femtocell base station.

As described above, apparatus 600 for controlling handover to prevent femtocell interference may perform the inter-frequency handover to an unshared frequency instead of the inter-cell handover from a macrocell to a femtocell when user equipment in a traffic state attempts to handover from a serving macrocell base station to a target femtocell base station, in accordance with an exemplary embodiment of the present invention. Accordingly, the femtocell interference problem and/or the handover failure problem may be prevented in accordance with an exemplary embodiment of the present invention.

Reference herein to a femtocell or a femtocell base station may be referred to a microcell, a microcell base station, a picocell, a picocell base station, an ubicell, and an ubicell base station. Accordingly, such base station may be understood as any access point that communicates with user equipment through short-range communication and provides an Internet service to user equipments.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling handover in a communication network where a macrocell is overlapped with a plurality of femtocells, a set of unshared frequencies is dedicatedly reserved for the macrocell and unshared with the femtocells, and a set of shared frequencies is reserved for and shared with both of the macrocell and the femtocells, the method comprising:
   establishing, using a first frequency, a channel and communicating between a macrocell base station of the macrocell and a user equipment;
   receiving a request of inter-cell handover of the user equipment from the macrocell base station to a target femtocell base station of one of the femtocells when the user equipment enters a service area of the target femtocell base station using a second frequency, wherein the request of the inter-cell handover to the target femtocell base station is transmitted from the user equipment;
   determining whether the first frequency of the macrocell base station is equivalent to the second frequency of the target femtocell base station in a case that the user equipment is allowed to access a corresponding target femtocell at the time of sending the request of the inter-cell handover; and
   performing inter-frequency handover of the user equipment using one of the unshared frequencies reserved for the macrocell without performing the requested inter-cell handover to the target femtocell base station, in response to the request of inter-cell handover, when the first frequency is equivalent to the second frequency.

2. The method of claim 1, further comprising:
   performing the inter-cell handover of the user equipment from the macrocell base station to the target femtocell base station when the first frequency is different from the second frequency.

3. The method of claim 1, wherein the determining includes:
   determining whether the first frequency of the macrocell base station is one of the shared frequencies; and
   comparing the first frequency with the second frequency of the femtocell base station when the first frequency is one of the shared frequencies.

4. The method of claim 1, further comprising:
   determining whether the first frequency of the macrocell base station is one of the shared frequencies or one of the unshared frequencies; and
   performing the inter-cell handover when the first frequency is one of the unshared frequencies.

5. The method of claim 1, wherein the performing includes:
   selecting one of the unshared frequencies when the first frequency is equivalent to the second frequency; and
   performing the inter-frequency handover with the selected unshared frequency.

6. A method for controlling handover in a communication network where a macrocell is overlapped with a plurality of femtocells, the method comprising:
   communicating, by a macrocell base station of the macrocell, with a user equipment at a first frequency;
   receiving a request of inter-cell handover of the user equipment from the macrocell base station to a femtocell base station of one of the femtocells, according to an entry of the user equipment to the one of the femtocells, wherein the request of the inter-cell handover to the femtocell base station is transmitted from the user equipment;
   determining whether the first frequency is equivalent to a second frequency assigned to the femtocell base station in a case that the user equipment is allowed to access the one of the femtocells at the time of sending the request of the inter-cell handover; and
   performing an inter-frequency handover without performing the requested inter-cell handover to a corresponding femtocell, in response to the request of the inter-cell handover, when the first frequency is equivalent to the second frequency, wherein the performing the inter-frequency handover in response to the request of the inter-cell handover comprises:

selecting one of a plurality of unshared frequencies in order to avoid frequency interference between the macrocell base station and the femtocell base station, wherein the unshared frequencies are frequencies dedicatedly assigned to the macrocell base station and unassigned to femtocell base stations of the femtocells; and performing the inter-frequency handover to the selected unshared frequency, wherein the inter-frequency handover comprises changing communication between the macrocell base station and the user equipment at the first frequency to communication between the macrocell base station and the user equipment at the selected unshared frequency.

7. The method of claim 6, wherein the user equipment makes the request of inter-cell handover when the user equipment in a traffic state enters into the one of the femtocells.

8. The method of claim 6, further comprising:

performing the inter-cell handover from the macrocell base station to the femtocell base station when the first frequency is different from the second frequency.

9. The method of claim 6, wherein, in the selecting an unshared frequency:

a frequency having load less than a given load level and quality higher than a given quality level is selected from the unshared frequencies dedicatedly assigned to the macrocell and unassigned to the femtocells.

10. A method for controlling handover in a communication network where a macrocell is overlapped with a plurality of femtocells, the method comprising:

transmitting, by a base station of the macrocell, a measurement control message to a user equipment at a first frequency when the user equipment in a traffic state enters from the macrocell to one of the femtocells, wherein the one of the femtocells uses a second frequency;

receiving, by the base station of the macrocell, a measurement report message from the user equipment;

determining, by the base station of the macrocell, whether the measurement report message includes a request of inter-cell handover from a macrocell base station of the macrocell to a femtocell base station of the one of the femtocells;

selecting one of a plurality of unshared frequencies in order to avoid frequency interference between the macrocell base station and the femtocell base station, when (i) the measurement report message includes the request of inter-cell handover from the macro cell to the one of the femtocells, (ii) the user equipment is allowed to access the one of the femtocells at the time of sending the measurement report message including the request of inter-cell handover, and (iii) the first frequency is equivalent to the second frequency, wherein the unshared frequencies are frequencies dedicatedly assigned to the macrocell base station and unassigned to femtocell base stations of the femtocells; and performing an inter-frequency handover to the selected unshared frequency, without performing the requested inter-cell handover to a corresponding femtocell, in response to the request of the inter-cell handover, wherein the inter-frequency handover comprises changing communication between the macrocell base station and the user equipment at the first frequency to communication between the macrocell base station and the user equipment at the selected unshared frequency.

11. The method of claim 10, further comprising:

performing an inter-cell handover from the macrocell to another macrocell when the measurement report message includes a request of inter-cell handover from the macrocell to another macro cell.

12. The method of claim 10, further comprising:

performing the inter-cell handover from the macrocell base station to the femtocell base station when the first frequency is different from the second frequency.

* * * * *